G. TOWNLEY (NOW BY MARRIAGE G. T. MILLER).
KITCHEN CABINET.
APPLICATION FILED JUNE 9, 1920.
1,369,577.
Patented Feb. 22, 1921
2 SHEETS—SHEET 1.
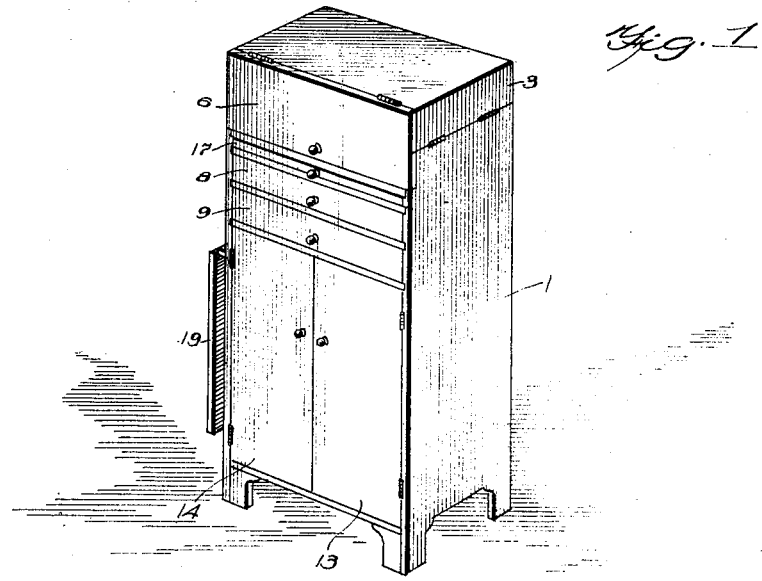
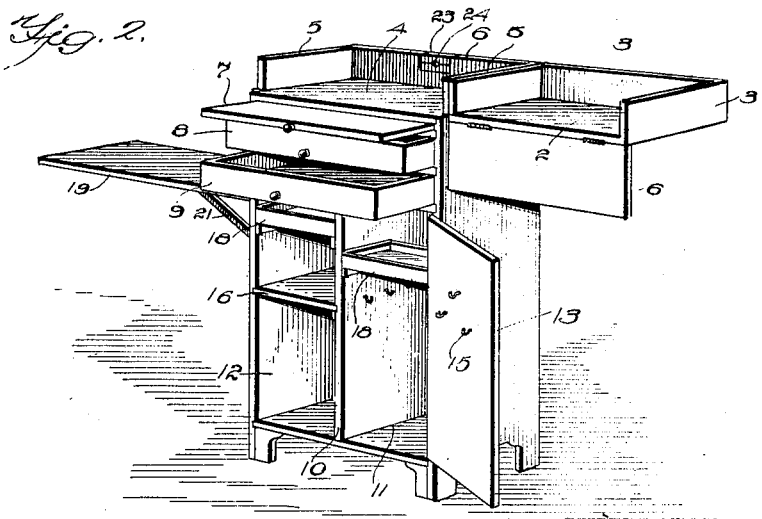
Inventor
Grace Townley
By C. L. Parker
Attorney G. TOWNLEY (NOW BY MARRIAGE G. T. MILLER).
KITCHEN CABINET.
APPLICATION FILED JUNE 9, 1920.
1,369,577.
Patented Feb. 22, 1921.
2 SHEETS—SHEET 2.
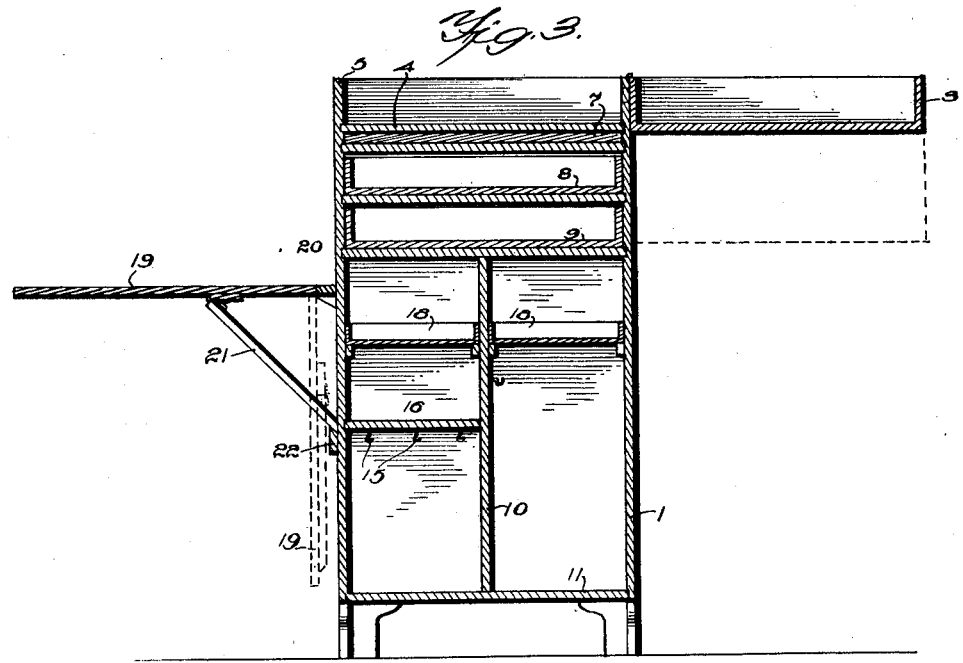
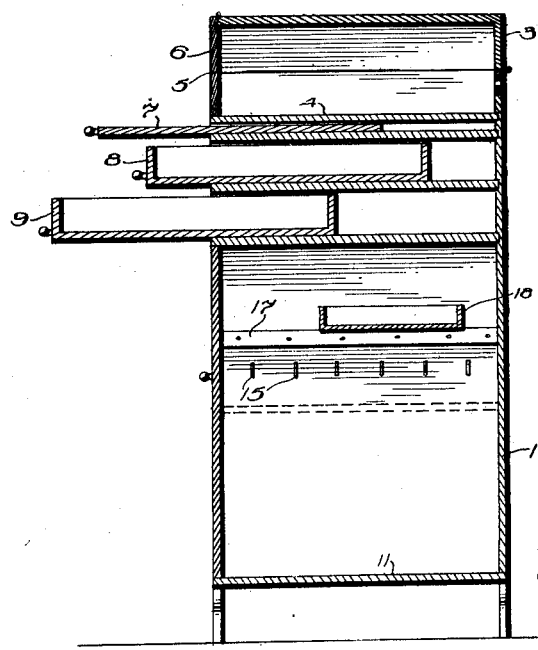
Inventor
Grace Townley
By
C. H. Parker
Attorney

UNITED STATES PATENT OFFICE.

GRACE TOWNLEY, (NOW BY MARRIAGE GRACE TOWNLEY MILLER,) OF BLACKSBURG, VIRGINIA.

KITCHEN-CABINET.

1,369,577.  Specification of Letters Patent.  Patented Feb. 22, 1921.

Application filed June 9, 1920. Serial No. 387,724.

*To all whom it may concern:*

Be it known that I, GRACE TOWNLEY, (now by marriage GRACE TOWNLEY MILLER,) a citizen of the United States, residing at Blacksburg, in the county of Montgomery, and State of Virginia, have invented certain new and useful Improvements in Kitchen-Cabinets, of which the following is a specification.

This invention relates to kitchen cabinets, and it comprises a cabinet having a hinged top which may be opened to provide a working surface or table the size of the cabinet, a sliding bread board arranged below the top which may be arranged in open position to afford additional working surface, a number of drawers arranged in the cabinet below the top, and cupboard space arranged below the drawers, the cupboard space being divided into sections of various sizes for the reception of pots, pans, bowls, and the like, and being provided with sliding trays arranged on suitable supports in the cupboard, and a folded leaf arranged on one side of the cabinet.

The invention herein disclosed is a piece of furniture the size and shape of the cabinet talking machines, whereby an article of pleasing appearance is produced for the use of people living in small apartments, artists studios, dormitories, and the like, or in any place where it is desirable to prepare a meal and where no kitchen is provided. The cabinet may be built as a portable piece of furniture or it may form a component part of an apartment.

In the drawings, I have shown one embodiment of the invention. In this showing:

Figure 1 is a perspective view of the cabinet closed,

Fig. 2 is a similar view of the cabinet showing the various parts in open position, Fig. 3 is a vertical transverse sectional view with the parts in the position shown in Fig. 2, and, Fig. 4 is a longitudinal vertical sectional view with the parts in the same position.

Referring to the drawings, the reference numeral 1 designates the cabinet as a whole. The top of the cabinet is provided with a hinged cover 2, which may be hinged at one side and which is provided with depending back and side portions 3, to provide a space at the top when the cabinet is closed (see Fig. 4). The top of the cabinet is flat, as at 4, and is provided with upstanding ledges 5 on each side and at the back. Hinged to the cover is a front section 6 which is of a width equal to the width of the flanges 3 and 5 and which closes the opening in the front, as shown in Fig. 1. It will be noted that when the device is in the open position, shown in Fig. 2 of the drawings, the front section 6 abuts the side of the cabinet and forms a brace for the cover to permit the use of the cover as a table section. A bread board 7 is arranged in the front below the top and drawers 8 and 9 are positioned below the bread board. One of these drawers may be used for holding silver and the like and the other for linens, such as table cloths, napkins, etc. The silver drawer may be provided with a partition (not shown) to form compartments for table silver and kitchen utensils. A cupboard space is arranged below the drawers and the cupboard space is divided by a central vertical partition 10. Two cupboard sections 11 and 12 are thus formed which are provided with doors 13 and 14. The door 14 is removed in Fig. 2 of the drawings to permit showing of the interior of the cupboard space and other features of the cabinet which would be hidden by the door in open position. One of the cupboard spaces 11 is used for storage of pots and pans, bowls, bread box, etc. Hooks 15 may be arranged in this section for the reception of various utensils, such as measuring cups, egg beaters, etc.

The second cupboard section is provided with a horizontal partition 16 dividing it into upper and lower sections. The two sections so formed may be used for storage of dishes, and dishes of different sets may advantageously be arranged in the upper and lower sections, separate from each other. Each of the cupboards is provided with ledges 17 arranged on the two sides and adapted to form supports for sliding shelves 18. These shelves may be advantageously used for the storage of condiment holders, cans of coffee, tea, cocoa, powdered milk, and the like.

A folding shelf 19 may be arranged on one side of the cabinet, preferably on the opposite side to the hinged side of the cover. As shown, the shelf is hinged at 20, and is provided with a hinged brace 21 adapted to engage a stop or support 22 on the side of the cabinet to hold the shelf in open position. When an electric stove or a grill is arranged on the top of the cabinet, an insulated support 23 may be arranged on the back of the top to permit the entrance of the electric cord or wire. Similarly, a pipe or tube for a gas stove may be arranged in the opening 24 provided in the insulated support.

It will be apparent that the present invention produces a cabinet that is very useful for people living in a restricted amount of space and not having the facilities of a kitchen at hand. A small electric or gas stove may be arranged on the top 4 and the stove will be entirely out of sight when the cover 2 is closed. When the cover is in open position, it affords additional table space and may be used as a support for relatively heavy articles, the section 6 acting as a brace for the cover. When the bread board 7 is in open position, it affords additional working space and the drop shelf 19 affords space which is convenient when washing dishes or which may be used as a serving table when preparing meals.

When the article is in closed position, as shown in Fig. 1, it produces a neat and attractive piece of furniture which has the appearance of the cabinet type of talking machine found in the majority of homes.

It is to be understood that the form of my invention herewith shown and described is to be taken as a preferred example of the same, and that various changes in the shape, size, and arrangement of parts may be resorted to without departing from the spirit of the invention or the scope of the subjoined claim.

I claim:

An article of furniture comprising a cabinet having a hinged cover, a flat working surface arranged on the top of the cabinet, vertical flanges formed on two or more sides of the top and the cover whereby the cover is spaced from the top, and a hinged section carried by one side of the cover, said hinged section engaging the side of the cabinet when in open position and forming a brace for the cover.

In testimony whereof I affix my signature in presence of two witnesses.

GRACE TOWNLEY,
*Now by marriage Grace Townley Miller.*

Witnesses:
NELLIE TOWNLEY,
OLIVER D. MANN.